Dec. 11, 1923.
R. R. WHITING
BOAT PROPELLER
Filed Jan. 30, 1923
1,477,200
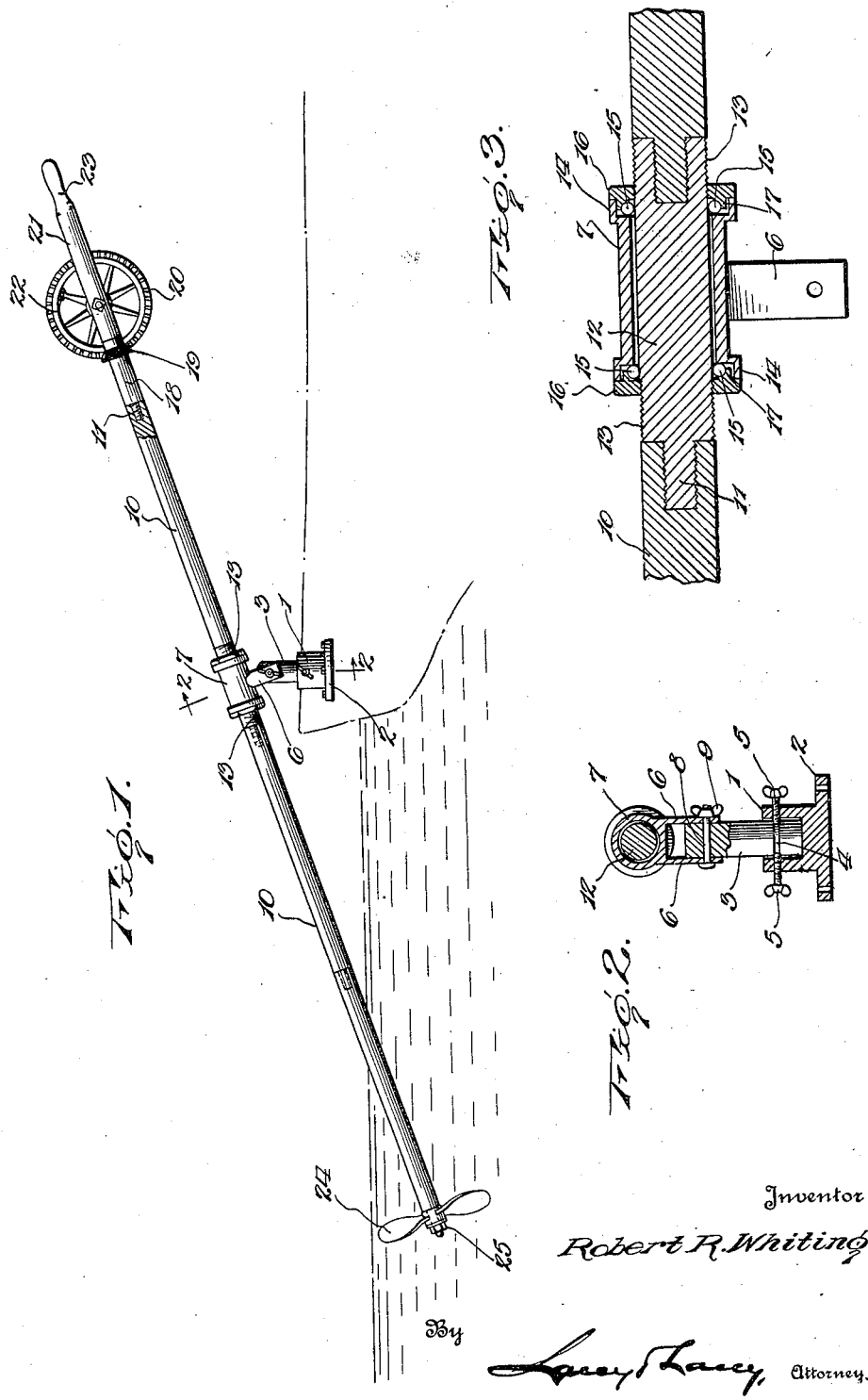
Inventor
Robert R. Whiting
By
Lacey & Lacey, Attorney.

Patented Dec. 11, 1923.

1,477,200

UNITED STATES PATENT OFFICE.

ROBERT R. WHITING, OF DARIEN, CONNECTICUT.

BOAT PROPELLER.

Application filed January 30, 1923. Serial No. 615,892.

*To all whom it may concern:*

Be it known that I, ROBERT R. WHITING, a citizen of the United States, residing at Darien, in the county of Fairfield and State of Connecticut, have invented certain new and useful Improvements in Boat Propellers, of which the following is a specification.

This invention seeks to provide a simple propelling mechanism which may be readily operated by hand so as to drive small boats and at the same time be capable of use for steering the boats. The invention also seeks to provide a propelling mechanism which may be readily set up for use when needed and which may be knocked down so as to be stored within a small space when not in use. The invention resides in certain novel features which are illustrated in the accompany drawing and will be hereinafter fully set forth.

In the drawing:

Figure 1 is a side view, partly broken away, of a propeller embodying my invention, the position of the same upon a boat being indicated;

Fig. 2 is an enlarged transverse section on the line 2—2 of Fig. 1;

Fig. 3 is an enlarged longitudinal section through the supporting bearing sleeve.

In carrying out my invention, I employ a socket or base member 1 having a flange 2 at its lower end through which bolts or other fastening devices may be driven into the deck of the boat or other fixed support adjacent the stern thereof to support the device. Fitted rotatably in the socket member is the lower end of a post or standard 3 which is provided near its lower end with an annular groove 4 adapted to be engaged by set screws 5 mounted in the sides of the socket member whereby the said post may be secured in a set position.

The upper end of the said post fits between the straps or ears 6 which depend from a bearing sleeve 7 and through the said ears or straps and the upper end of the post a bolt 8 is inserted, a wing nut 9 being fitted upon one end of the said bolt and adapted to be turned home against the adjacent strap whereby to secure the sleeve in a set position upon the post. It will be readily noted that the post is rotatable about a vertical axis in the socket 4, and the straps or ears 6 may be rotated pivotally about the bolt 8 so that the bearing sleeve 7 may be set at any desired angle to a horizontal plane and the steering and propelling shaft presently described may, therefore, be inclined to any degree according to the height of the boat relative to the body of water in which it is riding. By rotating the post 3 about a vertical axis, the propelling and steering shaft may be disposed at any desired angle to the longitudinal plane of the boat so that steering may be effected and, if the boat is to be kept upon a certain course for any considerable period, the screws 5 may be turned home against the post so as to secure it in the set position. The steering and propelling shaft consists of a series of sections 10 which are connected in axial alinement by threaded tenons 11 on one section engaging in threaded sockets in the meeting end of an adjacent section. The sections are thus removably connected so that they may be readily separated and stored within a case or in a small space when the device is not to be used and, when in use, they will be effectually held together so that the shaft will rotate as an entirety. The shafts pass through the bearing sleeve 7 and the ends of the section 12 which is disposed within the sleeve are externally threaded, as indicated at 13. The ends of the bearing sleeve 7 are offset to provide flanges or rims 14 to receive anti-friction bearings 15 if desired, and nuts 16 are mounted upon the threaded portions 13 of the said shaft section 12 and carry cones or other bearing members 17 adapted to engage the anti-friction balls 15 and thereby maintain the same in proper position. These nuts 16 are turned home against the ends of the sleeve or the rims 14 thereon so as to prevent endwise movement of the shaft within the sleeve but permit its free rotation therein. The foremost section 18 of the shaft carries a beveled pinion 19 meshing with a driving wheel 20 which is suitably mounted upon a handle member 21 which has a tenon and mortise engagement with the front extremity of the said section 18 so that the said section may rotate about the axis of the handle member and the handle member will be retained in engagement with the said shaft section. The driving wheel 20 is equipped with any convenient form of handle, indicated at 22, and the extremity of the handle member 21 is suitably shaped, as shown at 23, so that it may be conveniently and comfortably gripped by the hand of the user. The propeller 24 may be of any well known form and is secured to the rear end of the shaft in any desired manner so as to rotate therewith. I prefer to fit the propeller upon a threaded tenon at the rear end of the shaft and provide against its accidental withdrawal by a lock nut 25 mounted upon the said tenon and turned home against the propeller.

From the foregoing description, taken in connection with the accompanying drawing, it will be seen that I have provided an exceedingly simple device whereby boats may be readily propelled by hand power and the same device may be utilized as a rudder so that one man may easily navigate the boat. The device is intended more particularly for use upon small sail boats as an emergency provision in the event of the boat becoming becalmed, but it may, of course, be mounted upon any small boats which are to be handled by one person. By securing the device in a set position, the navigator is not required to balance the device and premature or accidental withdrawal or lifting of the propeller from the water is avoided.

Having thus described the invention, what is claimed as new is:

A boat-propelling mechanism comprising a socket member to be secured upon the boat, a post rotatably fitted in said socket and having an annular groove near its lower end, retaining devices mounted in the wall of the socket and engaging the annular groove in the post and adapted to secure the post in a set position in the socket, a bearing sleeve having depending straps disposed at opposite sides of and pivotally secured to the upper end of the post, means for securing said straps in a set position relative to the post, a shaft journaled in and extending through said sleeve, a propeller carried by the rear end of the shaft, and means at the front end of the shaft for rotating the same.

In testimony whereof I affix my signature

ROBERT R. WHITING. [L.S.]